(12) United States Patent
Hinton et al.

(10) Patent No.: US 10,107,441 B2
(45) Date of Patent: Oct. 23, 2018

(54) LEAKAGE AND ABRASION RESISTANT PIPE REINFORCEMENT SYSTEM AND METHOD OF INSTALLATION

(71) Applicant: Progressive Products, Inc., Pittsburg, KS (US)

(72) Inventors: Stephen T. Hinton, Pittsburg, KS (US); Todd N. Allison, Pittsburg, KS (US)

(73) Assignee: Progressive Products, Inc., Pittsburg, KS (US)

( * ) Notice: Subject to any disclaimer, the term of this patent is extended or adjusted under 35 U.S.C. 154(b) by 368 days.

(21) Appl. No.: 14/677,695

(22) Filed: Apr. 2, 2015

(65) Prior Publication Data

US 2015/0285425 A1    Oct. 8, 2015

Related U.S. Application Data

(60) Provisional application No. 61/974,162, filed on Apr. 2, 2014.

(51) Int. Cl.
*F16L 57/06* (2006.01)

(52) U.S. Cl.
CPC ......... *F16L 57/06* (2013.01); *Y10T 29/49826* (2015.01)

(58) Field of Classification Search
CPC ...................................................... F16L 57/06
USPC ..... 138/36, 120, 110, 97, 98, 99; 405/184.1; 285/16
See application file for complete search history.

(56) References Cited

U.S. PATENT DOCUMENTS

| | | | | |
|---|---|---|---|---|
| 3,833,267 A | * | 9/1974 | McCumber | B65G 53/523 138/103 |
| 4,130,300 A | * | 12/1978 | Sheridan | F16L 57/06 285/16 |
| 4,251,170 A | * | 2/1981 | Sheridan | F16L 57/06 138/103 |
| 4,684,155 A | * | 8/1987 | Davis | B65G 53/523 138/139 |
| 7,303,359 B1 | * | 12/2007 | Damman | F16L 57/06 138/97 |

* cited by examiner

*Primary Examiner* — Craig Schneider
*Assistant Examiner* — David Deal
(74) *Attorney, Agent, or Firm* — Law Office of Mark Brown, LLC; Christopher M. DeBacker (57) ABSTRACT

A pipe reinforcement system for reinforcing a pipe connection, pipe section, or length of pipe. The invention is most applicable to pipe sections used in commercial, industrial, or manufacturing processes conveying abrasive materials. The pipe reinforcement system uses several interlocking tiles placed over the pipe section to produce a smooth inner surface. The edges of the tiles overlap each other, producing a leak-resistant skin. A cover which maintains air pressure within the pipe is placed over the tiles, keeping them in place and holding them against the pipe.

11 Claims, 8 Drawing Sheets

LEAKAGE AND ABRASION RESISTANT PIPE REINFORCEMENT SYSTEM AND METHOD OF INSTALLATION

CROSS-REFERENCE TO RELATED APPLICATIONS

This application claims priority in U.S. Provisional Patent Application No. 61/974,162, filed Apr. 2, 2014, which is incorporated herein by reference in its entirety.

BACKGROUND OF THE INVENTION

1. Field of the Invention

The present invention relates generally to a pipe reinforcement system, and more specifically to a leak-resistant and abrasion-resistant pipe reinforcement system and a method of installation.

2. Description of the Related Art

Existing wear-resistant pipe connections and pipelines are made of typical materials which eventually wear over time, especially when transferring corrosive or abrasive materials. Regarding abrasive materials, the friction of the abrasive material causes significant wear in pipe sections, especially at bends or turns. Pipe fittings, such as elbows, have to be replaced frequently in order to maintain flow through the pipes. This causes a delay or shutdown in use of that pipe until the connection is replaced.

Previous attempts to alleviate this problem use abrasion resistance tiles placed inside of the pipe section, such as within a pipe elbow. However, this is a difficult and costly practice, especially on a system including multiple pipe sections.

Other previous methods reinforce only the back portion of a pipe section from the outside of the pipe. However, these methods typically rely on tiles that do not fit together easily, causing leakage once the pipe has been worn through. For example, in a system conveying fine powders, the powder can escape between gaps in the tiles once the pipe section is worn through. Such leaks render the reinforcement worthless, and the pipe has to be replaced prematurely.

What is needed is a pipe reinforcement system which is applied over a pipe section, providing improved resistance to leaks and abrasion.

Heretofore there has not been available a leak-resistant and abrasion-resistant pipe reinforcement system with the advantages and features of the present invention.

BRIEF SUMMARY OF THE INVENTION

A pipe reinforcement system for reinforcing a pipe connection, pipe section, or length of pipe. The invention is most applicable to pipe sections used in commercial, industrial, or manufacturing processes conveying abrasive materials. The pipe reinforcement system uses several interlocking tiles placed over the pipe section to produce a smooth inner surface. The edges of the tiles overlap each other, producing a leak-resistant skin. A cover which maintains air pressure within the pipe is placed over the tiles, keeping them in place and holding them against the pipe.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning The terms "pipe section," "pipe connection," and "pipe" should generally be interchangeable herein. The present invention includes elements that can be used on any pipe sections, connections, or other pieces, as long as they are the correct size.

II. Preferred Embodiment Pipe Reinforcement System 2

Figure 1:
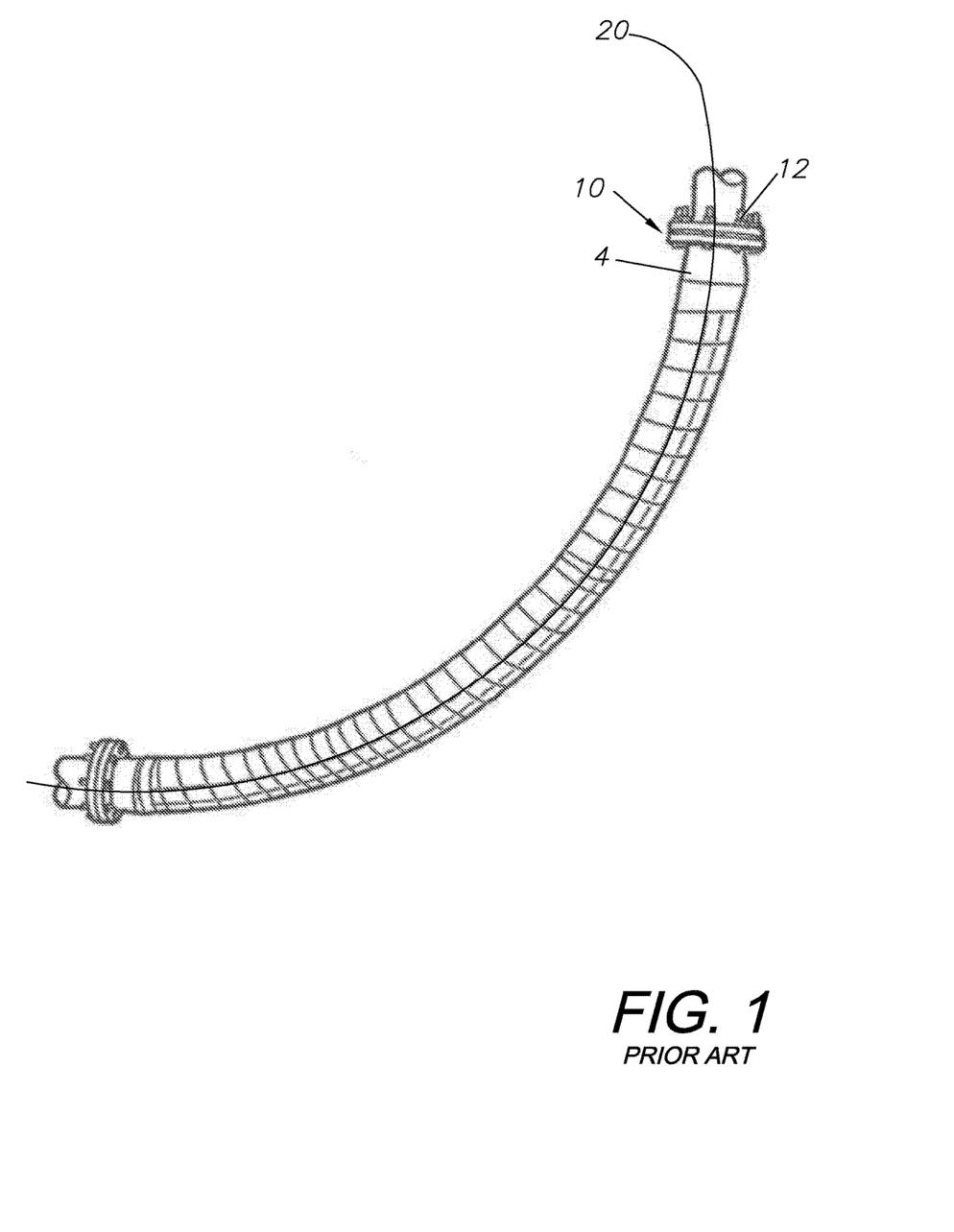
FIG. 1 is side elevational view of an embodiment of the present invention.
Figure 2:
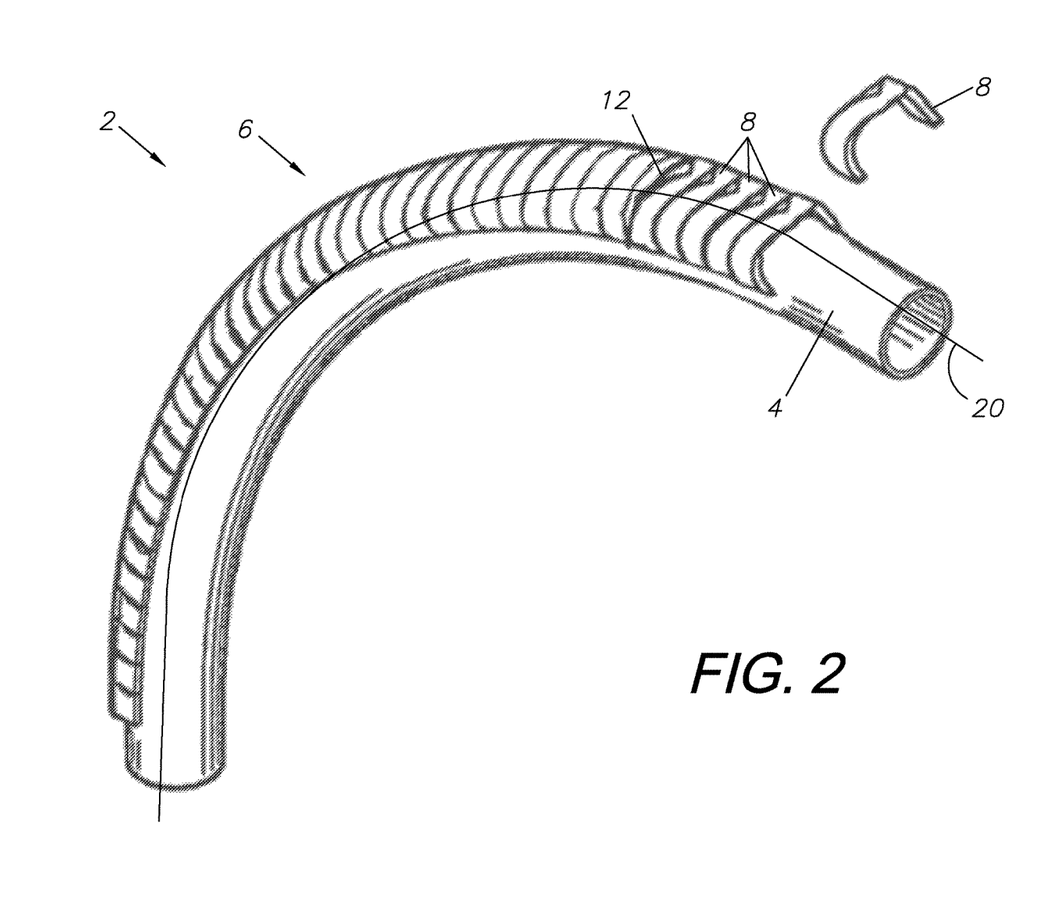
FIG. 2 is an isometric view of an embodiment of the present invention, displaying a step of installing an interlocking tile element onto a section of pipe.

FIG. 1 shows a prior art version of a pipe protection system. As shown in FIG. 2, the present invention is a pipe reinforcement system 2 for applying to existing pipe sections 4. As shown, a pipe section 4, here an elbow, is connected to other pipe sections 13 at a connection point 10. Because this piece is an elbow, material flowing through the pipe system will strike the edge of the elbow while making a turn. In the case of highly abrasive material, such as powders, this action can quickly wear out the outer surface of the pipe section 4. The centerline radius 20 of the pipe section 4 may vary.

The pipe reinforcement 6 is placed onto the failure-side of the pipe section 4. The pipe reinforcement 6 generally includes several interlocking tiles 8 which conform to the pipe 4 and a seal 12 applied over the tiles which acts to hold the tiles together and provides an air seal to maintain air pressure within the pipe. The seal can be any solid covering capable of holding the tiles together while maintaining air pressure. Examples include epoxy resin-sealed fiberglass, urethane, or outer steel covering could be used, or any sufficiently similar device. FIG. 2 shows the seal 12 placed over installed tiles 8.

Figure 3:
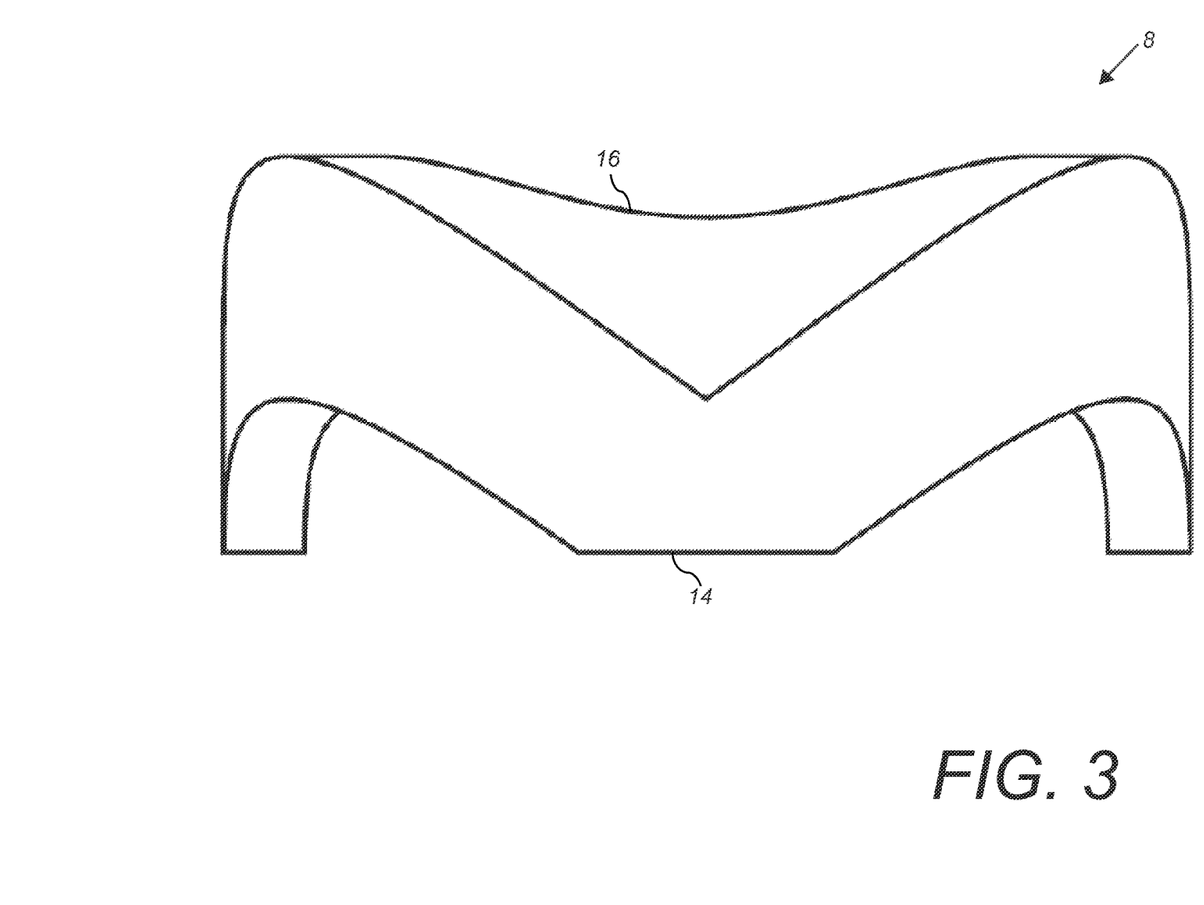
FIG. 3 is a top plan view of an interlocking tile element of an embodiment of the present invention.
Figure 7:
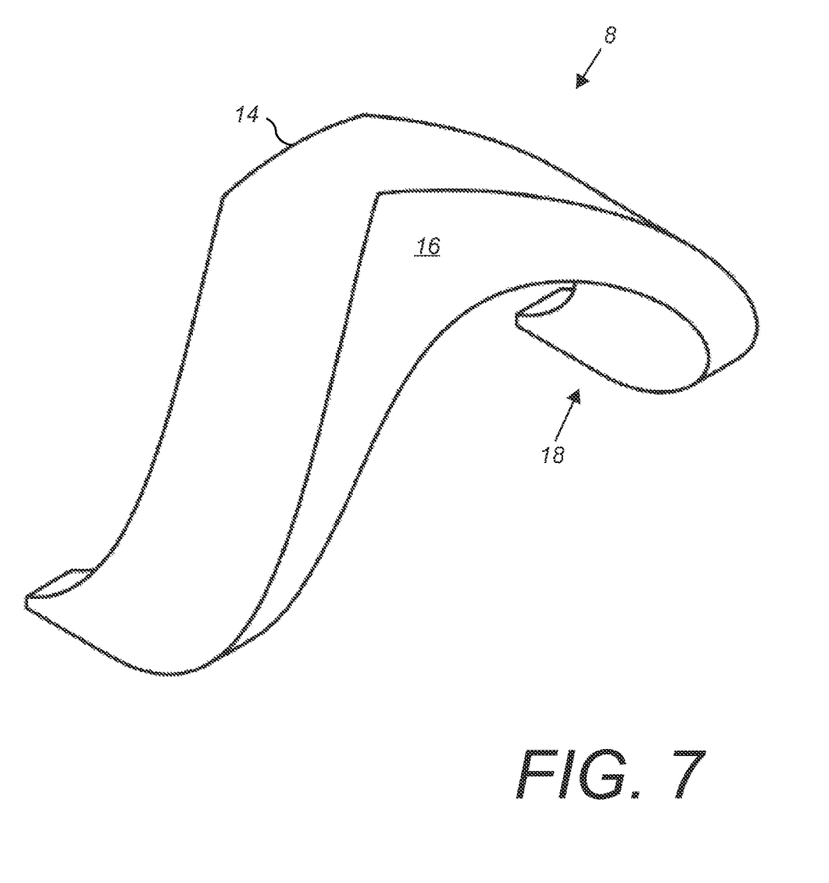
FIG. 7 is an alternative isometric view thereof
Figure 8:
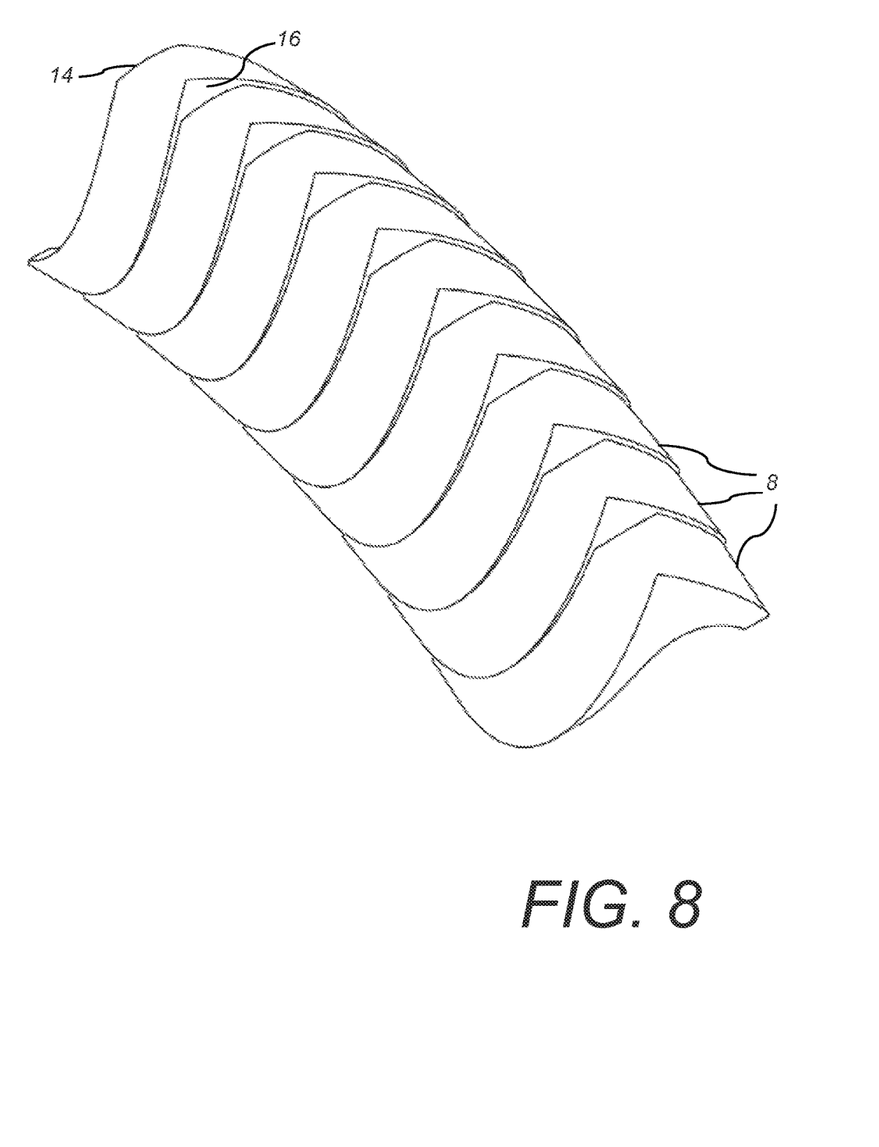
FIG. 8 is an isometric view of a several interlocked tile elements.

FIG. 3 shows the top view of a single tile 8. Each tile includes a front lip 14 and a back lip 16. The front lip of one tile is designed to lock below the back lip 16 of the next tile in a chain. This makes it easy to install several tiles in succession along a pipe section, thereby forming the pipe reinforcement 6 once the interlocked tiles are sealed by the seal 12. As shown in FIG. 7, the back lip 16 has a flattened "V" or "U" shape which, as shown in FIG. 8, allows the front lip 14, which has a corresponding shape, to partially engage the back lip 16 while leaving some of the surface area of the back lip for movement of the tiles if needed. This allows the tiles 8 to be used on pipe sections of varying curvature.

Figure 4:
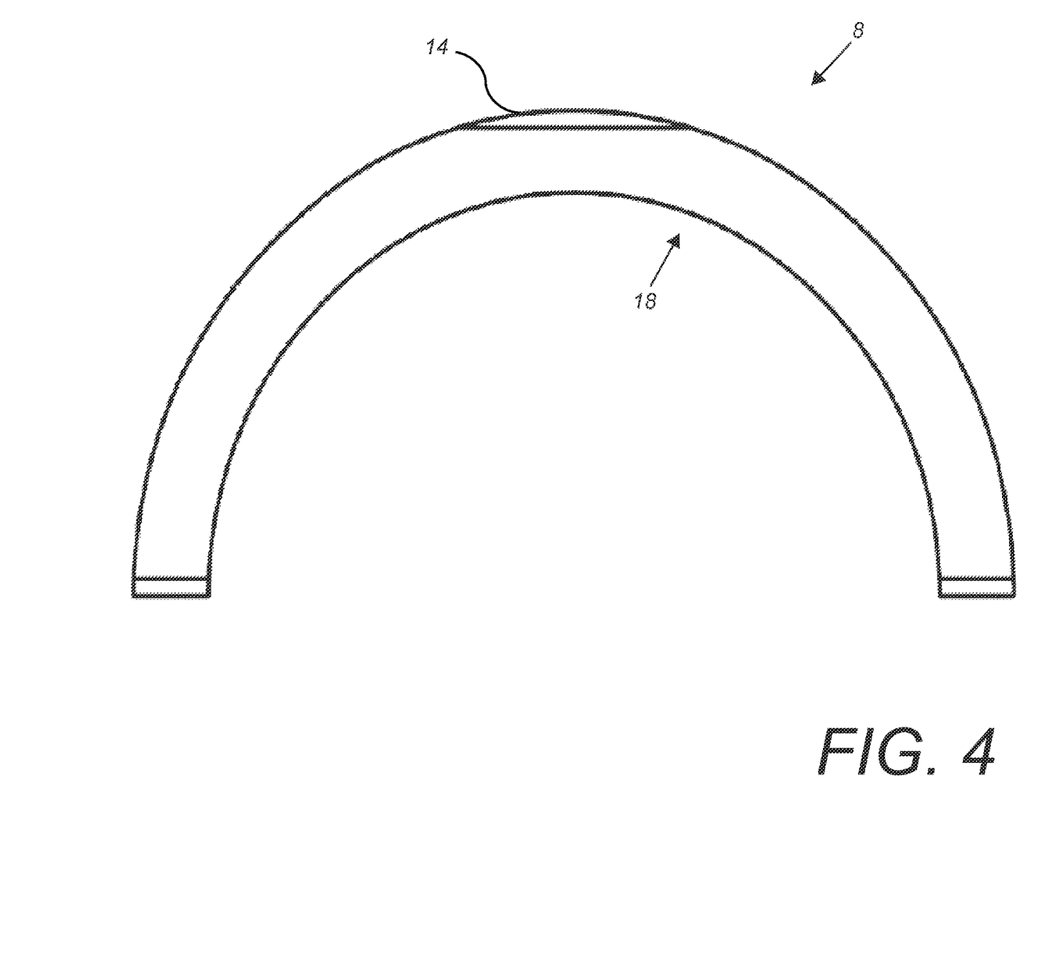
FIG. 4 is front elevational view thereof.
Figure 5A:
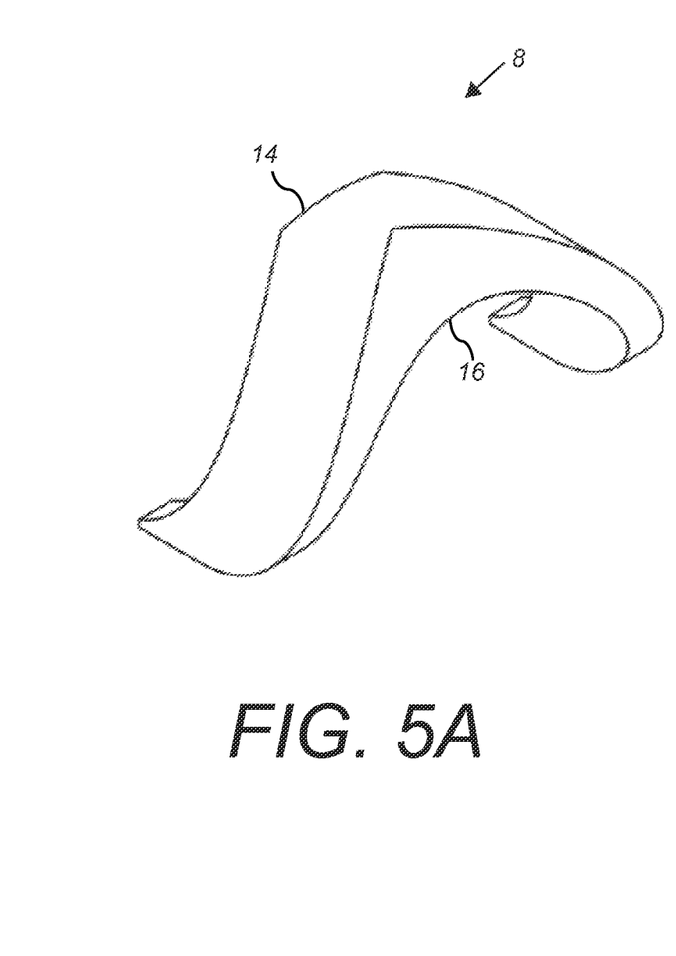
FIG. 5A is an isometric view thereof.
Figure 5B:
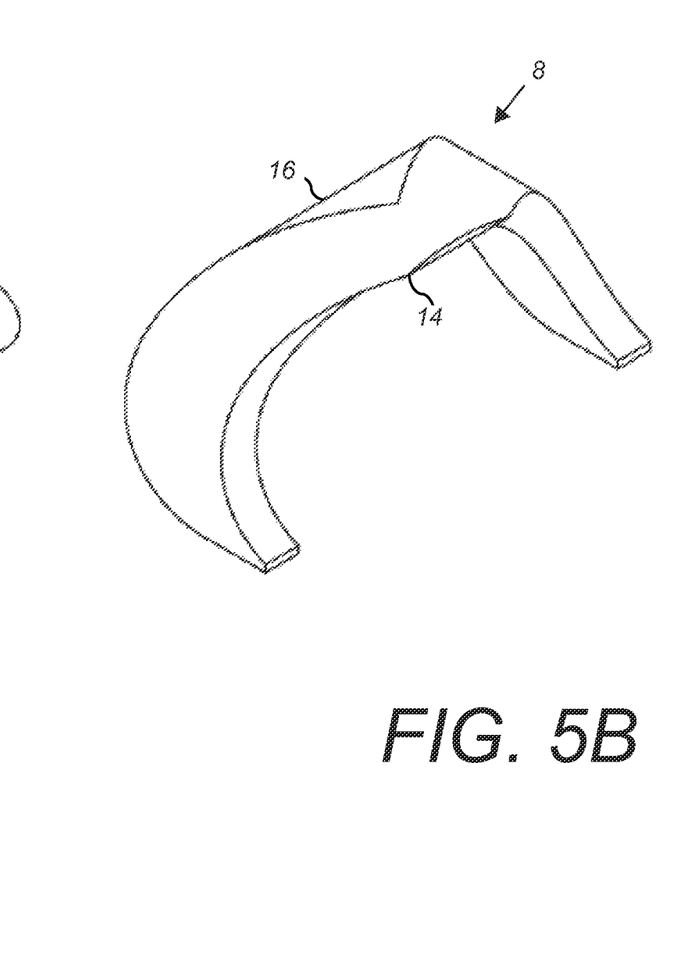
FIG. 5B is an alternative isometric view thereof.
Figure 6:
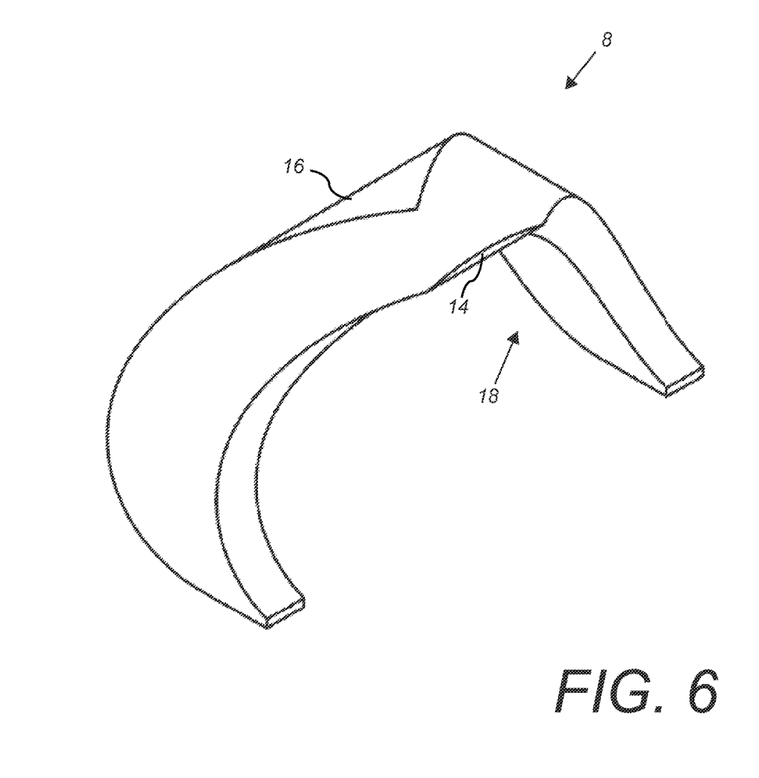
FIG. 6 is an alternative isometric view thereof

FIG. 4 indicates that the inner surface 18 of each tile 8 is radiused in order to conform to a specific pipe radius. This surface is non-tapered as shown.

FIGS. 5A-7 show various view of a tile 8. FIG. 8 shows the tiles 8 locked together, such that each front lip 14 is inserted into the next rear lip 16 along a chain.

As the pipe 4 wears out, the material comes into contact with the tiles 8. The tiles are therefore manufactured from a suitably resistant material, such as ceramics, alumina ceramic, basalt, tungsten carbide, silicon carbide, or any material suitably resistant to abrasion and/or corrosion.

Further, it may be preferable to manufacture the tiles from materials that reduce the coefficient of friction between the conveyed material and the tile itself. Examples of such materials include plastics, polymers, or porcelain.

It is to be understood that while certain embodiments and/or aspects of the invention have been shown and described, the invention is not limited thereto and encompasses various other embodiments and aspects.

The invention claimed is:

1. A pipe reinforcement system comprising:
    a pipe section configured to carry material, said pipe section having a centerline radius;
    a plurality of interlocking tiles, each tile comprising a radiused front lip, a radiused back lip, an exterior face, and a radiused, non-tapered inner face configured to correspond with the centerline radius of said pipe section;
    each front lip comprising a generally "V" or "U" shape;
    each said back lip comprising a flattened "V" or "U" shaped surface area configured to correspond with a respective front lip, such that each said interlocking tile configured to insert said front lip against said respective said back lip of another of said plurality of interlocking tiles; and
    an airtight seal applied to said exterior face of said plurality of interlocking tiles.

2. The pipe reinforcement system of claim 1, wherein said material is an abrasive material.

3. The pipe reinforcement system of claim 2, wherein said abrasive material is a fine powder.

4. The pipe reinforcement system of claim 1, wherein each of said plurality of tiles comprises a material selected from the list comprising: ceramics, alumina ceramic, basalt, tungsten carbide, silicon carbide, plastics, polymers, and porcelain.

5. The pipe reinforcement system of claim 1, wherein said airtight seal comprises a material selected from the list comprising: epoxy resin-sealed fiberglass, urethane, and steel.

6. The pipe reinforcement system of claim 1, wherein said pipe section comprises a bend of at least 45 degrees.

7. A pipe reinforcement system comprising:
    a pipe section configured to carry material, said pipe section having a centerline radius;
    a first tile and a second tile, each said tile comprising a respective radiused front lip, radiused back lip, an exterior face, and a radiused, non-tapered inner face configured to correspond with the centerline radius of said pipe section;
    said second tile front lip configured to insert beneath said first tile back lip while said first tile is positioned against said pipe section;
    each front lip comprising a generally "V" or "U" shape;
    each said back lip comprising a flattened "V" or "U" shaped surface area configured to correspond with a respective front lip; and
    an airtight seal applied to said exterior face of said first and second tiles.

8. The pipe reinforcement system of claim 7, wherein said material is an abrasive material.

9. The pipe reinforcement system of claim 8, wherein said abrasive material is a fine powder.

10. The pipe reinforcement system of claim 7, wherein each of said first and second tiles comprises a material selected from the list comprising: ceramics, alumina ceramic, basalt, tungsten carbide, silicon carbide, plastics, polymers, and porcelain.

11. The pipe reinforcement system of claim 7, wherein said airtight seal comprises a material selected.

* * * * *